UNITED STATES PATENT OFFICE.

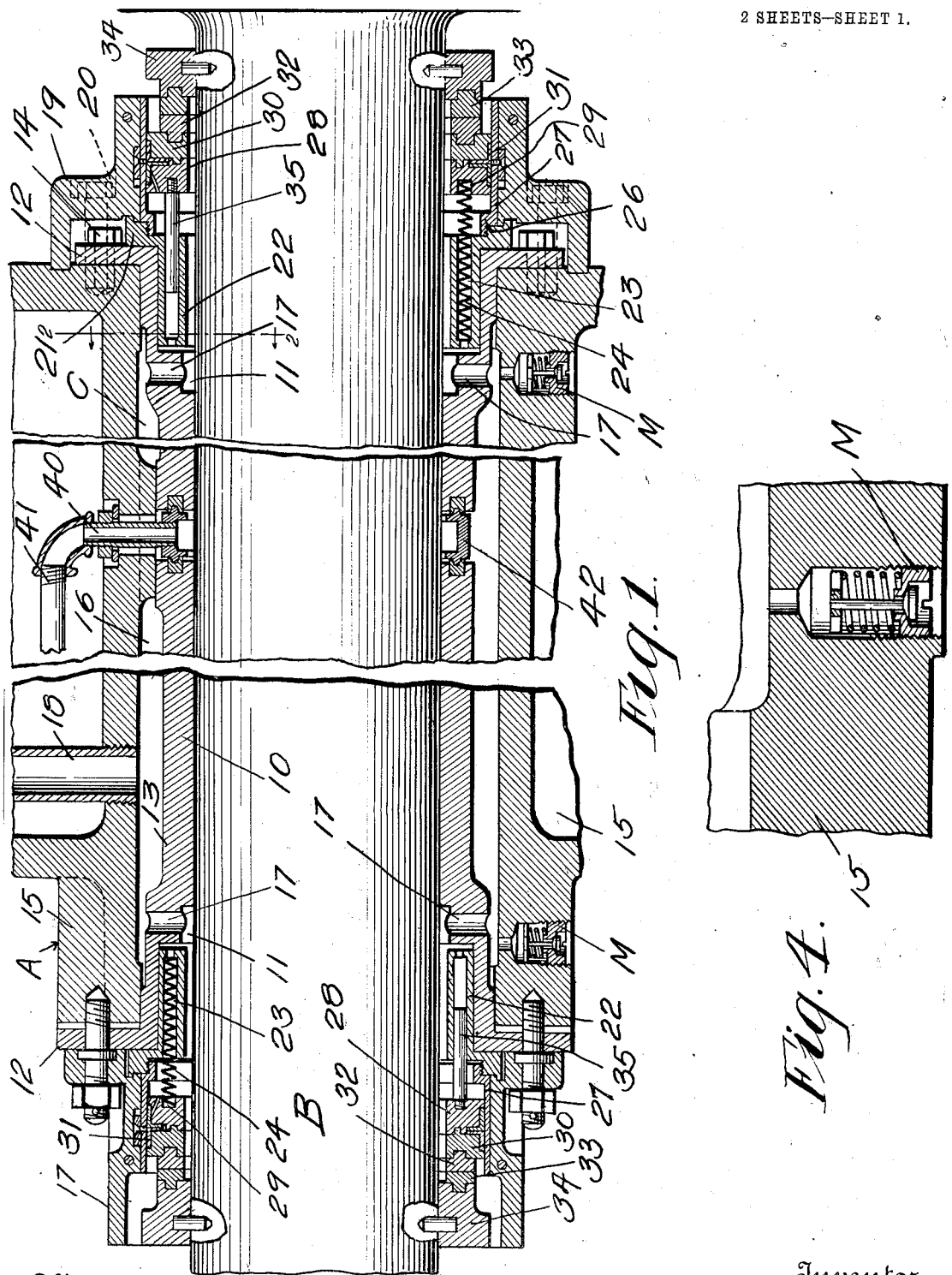

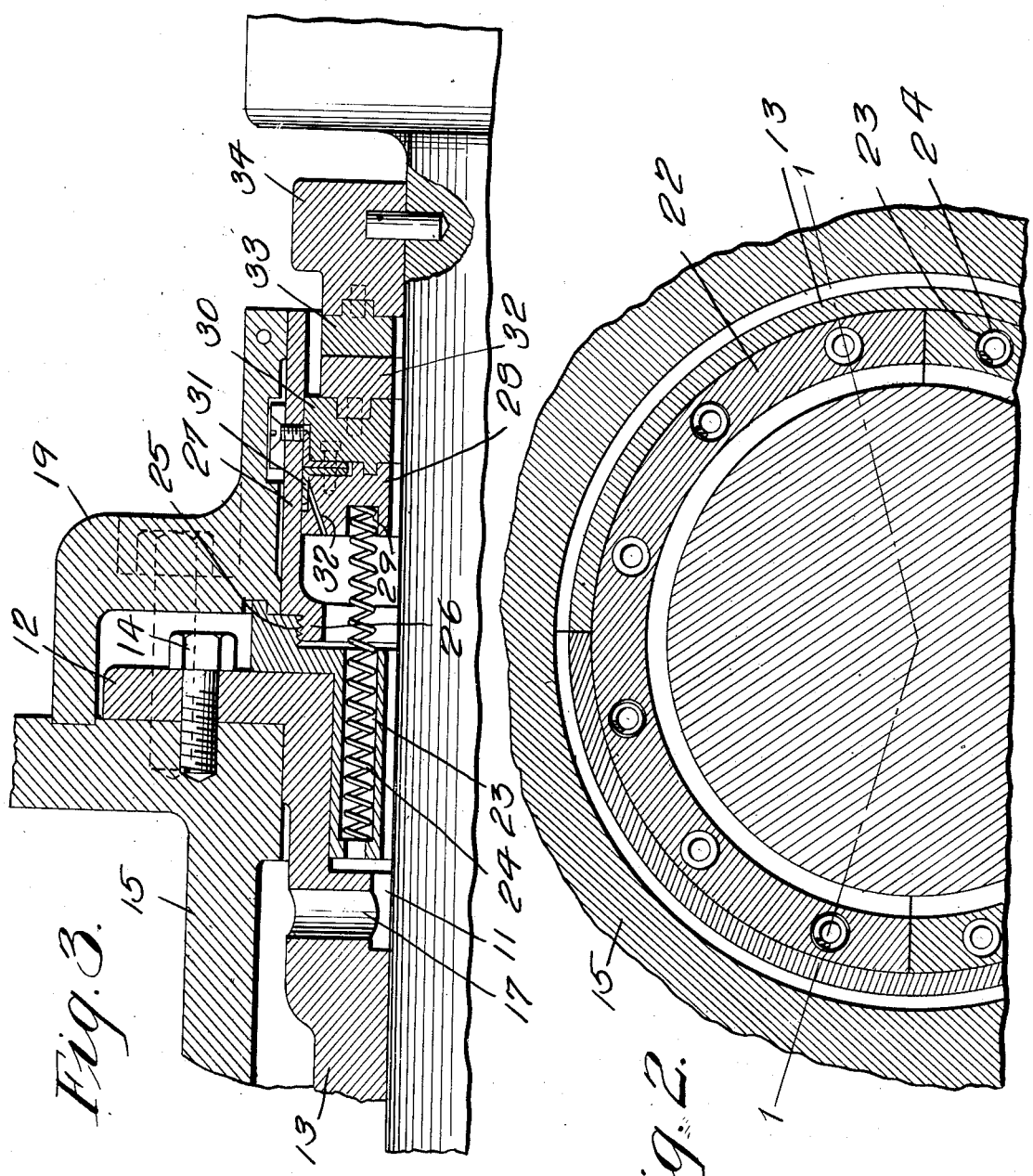

HOWARD D. BENNETT, OF BALTIMORE, MARYLAND.

PACKING.

1,097,074. Specification of Letters Patent. Patented May 19, 1914.

Application filed April 2, 1913. Serial No. 758,454.

*To all whom it may concern:*

Be it known that I, HOWARD D. BENNETT, a citizen of the United States, residing at Baltimore, State of Maryland, have invented certain new and useful Improvements in Packings; and I do hereby declare the following to be a full, clear, and exact description of the invention, such as will enable others skilled in the art to which it appertains to make and use the same.

This invention relates to packing and particularly to a packing for use in connection with a rotating shaft and its bearing under conditions where the alinement of the shaft is irregular as the result of the shaft shifting laterally and wabbling around the true center of rotation or becoming eccentric from wear in the bearing.

The object of the invention resides in the provision of a packing for use in connection with a shaft and its bearing which will obviate undue wear of the packing as a result of wabbling of the shaft and which will be maintained tight at all times during such wabbling, the tight condition of the packing being constantly effected by fluid or spring pressure or both exerted within the bearing against the packing.

A further object of the invention resides in the provision of a packing which when used in connection with a submerged shaft and its bearing will permit efficient lubrication of the bearing and at the same time will prevent water from without entering the bearing.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a longitudinal section through a dredge cutter shaft and its bearing showing the improved packing associated therewith and the shaft disclosed in elevation. Fig. 2, a section on the line 2—2 of Fig. 1; Fig. 3, an enlarged fragment of what is shown in Fig. 1; and Fig. 4, a section through the grit valve employed in the bearings.

Referring to the drawings, A indicates generally the bearing and B the cutter shaft rotatably mounted therein. The bearing A is shown as comprising a sleeve 10 which directly engages the periphery of the shaft B. The bore of the sleeve 10 is stepped at each end as at 11 so that the terminal portions of said bore are disposed in spaced relation to the periphery of the shaft B for a purpose that will presently appear. The sleeve 10 of the bearing is provided at each end with outwardly directed flanges 12, while the outer wall of said sleeve is provided with a circumscribing groove 13. Surrounding the sleeve 10 and secured to the latter by means of bolts 14 passing through the flanges 12 is a body portion 15 the inner wall of which is provided with a groove 16 substantially mating with the groove 13 and forming in conjunction with the latter a chamber C. This chamber C communicates at its ends respectively with the spaces between the ends of the sleeve 10 and the shaft B by means of passages 17. Mounted in the body 15 is a pipe 18 which is adapted to be connected with a suitable fluid supply, said pipe communicating with the chamber C whereby fluid supplied through the pipe 18 will enter the chamber C and thence pass through the passages 17 into the space between each end of the sleeve 10 and the shaft B. It will be noted that the fluid employed may be in either the form of a washing fluid for the bearing or in the form of a lubricating fluid.

Surrounding the shaft B and secured against the out board end of the bearing A is a packing guard 19, said guard being secured in place by means of bolts 20 passing through same and into the flange 12 and body 15. This guard clamps between same and the body portion 10 an outwardly directed flange 21 of a cage 22, said cage extending inwardly into the space between the end of the sleeve 10 and the shaft B. This cage 22 is provided with a plurality of longitudinal recesses 23 in certain of which are seated springs 24. The flange 21 of the cage 22 is stepped on its outer side to form a shoulder 25 which is provided with threads and with which is engaged the threaded end 26 of a cylinder 27, said cylinder bearing against the inner wall of the guard 19 and extending parallel to the shaft B.

Mounted in the cylinder 27 for movement longitudinally of the shaft B is a piston 28 the inner side of which is provided with a plurality of recesses 29 which receive the outer ends of respective springs 24. Interlocking with the piston 28 and disposed outwardly thereof is a follower 30 and confined between the piston and follower is a T-packing the arms of which bear against the wall of the cylinder 27. Formed through the piston 28 is a passage 32' which opens against one arm of the packing 31 and serves to transmit fluid pressure against said packing so as to increase the efficiency thereof. Disposed outwardly of the follower 30 and interlocking with same is a packing ring 32 which engages a packing ring 33 interlocked with a collar 34 fixed upon the shaft B. It will be noted that the walls of the piston 22, follower 30 and packing rings 32 and 33 which are adjacent the shaft B are disposed in spaced relation to said shaft whereby the shaft is free to wabble and rotate eccentrically without engaging either the piston 28, follower 30 or packing ring 32. It will also be noted that the outer wall of the packing ring 32 is disposed in spaced relation to the adjacent wall of the cylinder 27 which will permit the shaft B to wabble and rotate eccentrically without bringing the packing ring 33 into engagement with the cylinder 27. By thus removing the shaft B from possibility of engagement with the piston, follower, or packing rings and also the removal of the possibility of engagement between the packing ring 33 and the cylinder 27 the wear upon the packing rings 32 and 33 is reduced to a minimum, such wear being entirely eliminated under conditions that are the greatest detriment to the prolonged life of a bearing. Mounted on the inner side of the piston 28 is a plurality of guide pins 35 which travel in the recesses 23 not occupied by the springs 24, said pins serving to effect true movement of the piston 28 and adjacent parts longitudinally of the shaft B as will be apparent and preventing rotation of the piston with the shaft.

Secured to the in board end of the sleeve 10 by means of the bolts 14 passing through the flange 12 and into the body 15 is a suitable guard 37. Mounted between the guard 37 and the shaft B is a packing similar in every respect to the packing mounted between the guard 19 and the shaft B and detailed reference thereto will therefore be omitted.

The action of the packing under ordinary conditions can be maintained through the medium of the springs 24 which operate to force the piston 28 outwardly and maintain the packing ring 32 in tight engagement with the packing ring 33. Under such ordinary conditions a lubricating fluid can be supplied under light pressure from the pipe 18 as will be obvious. When the bearing is submerged to a great depth however in the operation of dredging the pressure of the water will tend to cause same to force its way between the rings 32 and 33 and into the bearing. Under these conditions the fluid is supplied through the pipe 18 under sufficient pressure to operate against the inner side of the piston 28 and force the packing ring 32 against the packing ring 33 with sufficient force to positively exclude the passage of any water between said rings and into the bearing as the circulating fluid which is maintained at a greater pressure than the outside water will escape through any opening between the rings 32 and 33. At the same time it will be apparent that the lubrication of the bearing is efficiently maintained.

While the packing has been shown and described in connection with the bearing and cutter shaft of a dredge it will be apparent that same may be adapted for use in connection with other shafts and bearings which are operated either out of water or submerged, without in any way departing from the scope of the invention as set forth in the appended claims.

The body 15 has mounted therein a grit valve M of the spring controlled type through the medium of which such grit may accumulate in the bearing where it may be readily discharged. There is also mounted in the bearing a tube 40 connected to a lubricant supply pipe 41. Lubricant is forced from the pipe 41 to the tube 40 and thence into a circumscribing ring 42 directly against the shaft B and this lubricant will work along between the sleeve 10 and the shaft so as to materially enhance the lubrication of the bearing.

The bearing as shown in Fig. 1 is arranged for lubricant supply through tube 40 and washing fluid through tube 18. However the bearing may be operated with either one of these tubes left off and the corresponding connections omitted when required.

What I claim is:—

1. The combination with a movable member and a bearing therefor, of a plurality of packing elements closing communication with the interior of the bearing and having opposite faces positioned to be subjected to fluid pressures present exteriorly and interiorly of the bearing respectively.

2. The combination with a movable member and a bearing therefor, of a plurality of packing elements closing communication with the interior of the bearing and having opposite faces positioned to be subjected to fluid pressures present exteriorly and interiorly of the bearing respectively, and means for forcing said packing elements into engagement with each other.

3. The combination with a movable member, of a bearing therefor having a terminal portion disposed in spaced relation to the member, packing elements between the terminal portion of the bearing and the member closing communication with the interior of the bearing and having opposite faces positioned to be subjected to fluid pressures present exteriorly and interiorly of the bearing respectively, and means for forcing said packing elements into engagement with each other.

4. The combination with a movable member, of a bearing therefor having terminal portions disposed in spaced relation to the member, packing elements between each terminal portion of the bearing and the member closing communication with the interior of the bearing, said packing elements having opposite faces positioned to be subjected to fluid pressures present exteriorly and interiorly of the bearing respectively, and means for moving the packing elements at each end of the bearing into engagement with each other.

5. The combination with a movable member and a bearing therefor, of a plurality of annular packing elements circumscribing the member and having their cylindrical faces disposed in spaced relation to the bearing and member respectively, said packing elements closing communication with the interior of the bearing whereby their cylindrical faces will be subjected to fluid pressures present interiorly and exteriorly of the bearing respectively, and means for forcing said packing elements into engagement with each other.

6. The combination with a movable member and a bearing therefor, of a packing interposed between the bearing and the member, and comprising a packing element fixed to the member and capable of movement transversely of the bearing under the influence of untrue movement of the member, a piston slidably mounted in the bearing for movement longitudinally of the member, a packing element supported by said piston for contact with the first named element, the inner end of said piston being exposed to the influence of fluid pressure exerted within the bearing whereby said piston will be moved outwardly of the bearing to force the last named element into engagement with the first named element.

7. The combination with a movable member and a bearing therefor, of a packing interposed between the bearing and the member, and comprising a packing element fixed to the member and having its outer wall disposed in spaced relation to the adjacent wall of the bearing whereby said element is free to move transversely of the bearing under the influence of untrue movements of the member, a second packing element mounted for movement longitudinally of the member and adapted to contact with the first named element, and means for moving said last named packing element longitudinally of the member to force same into engagement with the first named element.

8. The combination with a movable member and a bearing therefor, of a packing interposed between the bearing and the member, and comprising a packing element fixed to the member and having its outer wall disposed in spaced relation to the adjacent wall of the bearing whereby said element is free to move transversely of the bearing under the movements of the untrue movements of the member, a second packing element mounted within the bearing for movement longitudinally of the member and adapted to contact with the first named element, and means for moving said last named packing element longitudinally of the member to yieldingly force same into engagement with the first named packing element.

In testimony whereof, I affix my signature, in the presence of two witnesses.

HOWARD D. BENNETT.

Witnesses:
 EUGENE FREDERICK,
 WARD B. COE.